(12) United States Patent
Ayukawa

(10) Patent No.: US 10,235,111 B2
(45) Date of Patent: Mar. 19, 2019

(54) JOB PROCESSING DEVICE, SERVER AND NON-TRANSITORY RECORDING MEDIUM STORING A COMPUTER READABLE PROGRAM FOR SUBSTITUTE EXECUTION OF A JOB

(71) Applicant: Konica Minolta, Inc., Chiyoda-ku, Tokyo (JP)

(72) Inventor: Shoichi Ayukawa, Hino (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 0 days.

(21) Appl. No.: 15/917,197

(22) Filed: Mar. 9, 2018

(65) Prior Publication Data

US 2018/0275936 A1    Sep. 27, 2018

(30) Foreign Application Priority Data

Mar. 27, 2017   (JP) ................................ 2017-061887

(51) Int. Cl.
    *G06F 3/12*      (2006.01)
    *G06F 21/60*     (2013.01)
    *G06F 21/31*     (2013.01)

(52) U.S. Cl.
    CPC ............ *G06F 3/1261* (2013.01); *G06F 3/121* (2013.01); *G06F 3/1234* (2013.01); *G06F 3/1285* (2013.01); *G06F 21/608* (2013.01); *G06F 21/31* (2013.01)

(58) Field of Classification Search
    None
    See application file for complete search history.

(56) References Cited

U.S. PATENT DOCUMENTS

2013/0169989 A1 *   7/2013   Oki .......................... G06F 3/12
                                                          358/1.14

FOREIGN PATENT DOCUMENTS

JP        2005-167637 A      6/2005
JP        2012-232533 A     11/2012

* cited by examiner

*Primary Examiner* — Andrew H Lam
(74) *Attorney, Agent, or Firm* — Buchanan Ingersoll & Rooney PC

(57) ABSTRACT

Disclosed is a job processing device, including a job receiver; a hardware processor that: detects a trouble caused in the job processing device; searches other job processing devices which can be a substitute execution destination of the job in case that the trouble is detected, displays the searched job processing devices as candidates of the substitute execution destination, and receives a selection of the displayed job processing device as the substitute execution destination from a user, transfers the job to the selected job processing device, and specifies the user who selects the substitute execution destination; and a memory that stores information in which the selected job processing device is related to the specified user, wherein in case that the information is stored in the memory, the hardware processor displays the searched job processing device and the user to whom the searched job processing device is related.

17 Claims, 8 Drawing Sheets

FIG.4

| SUBSTITUTE EXECUTION DESTINATION | USER NAME | TRANSFER TIMING | DEPARTMENT |
|---|---|---|---|
| DEVICE B | USER A | 20xx/10/20 | DEPARTMENT X |
| DEVICE B | USER C | 20xx/10/21 | UNKNOWN |
| DEVICE C | USER D | 20xx/10/20 | DEPARTMENT Z |
| DEVICE D | USER F | 20xx/10/22 | DEPARTMENT X |
| DEVICE E | USER E | 20xx/10/23 | DEPARTMENT X |
| DEVICE G | USER D | 20xx/10/23 | DEPARTMENT Z |
| DEVICE F | USER G | 20xx/10/24 | DEPARTMENT X |
| . | . | . | . |

| CANDIDATES OF SUBSTITUTE EXECUTION DESTINATION | USER NAME | TRANSFER TIMING | DEPARTMENT |
|---|---|---|---|
| DEVICE B | USER A | 20xx/10/20 | DEPARTMENT X |
| | USER C | 20xx/10/21 | UNKNOWN |
| DEVICE C | USER D | 20xx/10/20 | DEPARTMENT Z |
| DEVICE Z | — | — | — |

DISPLAY CANDIDATES OF SUBSTITUTE EXECUTION DESTINATION AND USER WHO SELECTED SUBSTITUTE EXECUTION DESTINATION IN THE PAST. SELECT SUBSTITUTE EXECUTION DESTINATION.

SUBSTITUTE EXECUTION START

66

JOB PROCESSING DEVICE, SERVER AND NON-TRANSITORY RECORDING MEDIUM STORING A COMPUTER READABLE PROGRAM FOR SUBSTITUTE EXECUTION OF A JOB

The entire disclosure of Japanese Patent Application No. 2017-61887 filed on Mar. 27, 2017, is incorporated herein by reference in its entirety.

BACKGROUND

Technological Field

The present invention relates to a server and a non-transitory recording medium storing a computer readable program which can support a user so as to promptly execute a job at the transfer destination of the job in case that the job is transferred, and a job processing device.

Description of the Related Art

When an MFP (Multi Function Peripheral) having the printer function, the facsimile function and the like which are ordinarily used by a user cannot execute the printing due to the trouble, such as the jamming, the exhaustion of the toner, or the like, it takes a long time to finish the printing in case that the printing is executed after the trouble is solved. Therefore, as the function for executing the printing even if the trouble is caused, the substitute printing function has been proposed.

The substitute printing is the function for instructing another MFP which is normally operated and can execute the printing, to substitutionally execute the printing by transferring the print job from the MFP which cannot be normally operated.

For example, in Japanese Patent Application Publication No. 2012-232533, the following technology is disclosed. In the technology, when the trouble is caused, the management server searches another MFP which can execute the printing and automatically transfers the print job to the searched MFP to instruct the searched MFP to substitutionally execute the printing. Further, in Japanese Patent Application Publication No. 2005-167637, the following method is disclosed. In this method, when the substitute printing is executed, the model name, the place and the feature of the transfer destination of the print job are indicated as a list and a user selects the suitable model of the printer by using the list.

In case that a user cannot perfectly grasp the device which is the transfer destination, there is some possibility that the printed document cannot be promptly obtained only by using the information of the transfer destination, which is displayed on the display unit. For example, even if the name of the installation place of the device which is the transfer destination is displayed, a user cannot arrive at the installation place. Alternatively, even if the user can arrive at the installation place, in case that a plurality of devices are installed at the installation place, the user cannot recognize which device is the transfer destination. Further, in case that a confidential print job is transferred it is necessary to carry out the operation, such as the log-in operation or the entry of the password, for the device which is the transfer destination. Even if the model of the device which is the transfer destination is displayed, in case that the user does not recognize the method for operating the device, there is high possibility that it takes a long time to start the printing.

As described above, in order to promptly execute the printing by using the device which is the transfer destination, there are some cases in which the contents displayed on the display unit are not sufficient.

In the method disclosed in Japanese Patent Application Publication No. 2005-167637, because the user can select the transfer destination of the print job, when the user selects the device of which the accurate position, the operating method and the like are perfectly recognized by the user as the transfer destination, it is possible to promptly obtain the printed document at the transfer destination. However, even in case that there is no device of which the accurate position, the operating method and the like are recognized among the devices which are the candidates of the transfer destination, the user is required to necessarily select the transfer destination among the devices. In this case, there is low possibility that the user can promptly obtain the printed document.

SUMMARY

One of the objects of the present invention is to provide a job processing device, a server and a non-transitory recording medium storing a computer readable program which provide the information which is useful for suitably arriving at and operating the device which is the transfer destination, in case that a job is transferred to another device to instruct another device to substitutionally execute the job due to the occurrence of the trouble.

To achieve at least one of the abovementioned objects, according to an aspect of the present invention, a job processing device reflecting one aspect of the present invention, comprises:
  a job receiver that receives an entry of a job;
  a hardware processor that:
  executes the job received by the job receiver,
  detects a trouble caused in the job processing device;
  searches one or more other job processing devices which
    can be a substitute execution destination of the job in
    case that the trouble is detected.
  displays the searched job processing devices as candidates
    of the substitute execution destination of the job on a
    display, and receives a selection of the displayed job
    processing device as the substitute execution destina-
    tion of the job among the candidates from a user,
  transfers the job to the selected job processing device
    which is the substitute execution destination, and
  specifies the user who selects the substitute execution
    destination; and
  a memory that stores information in which the selected
job processing device which becomes a transfer destination
of the job is related to the specified user who selects one of
the searched job processing devices as the substitute execu-
tion destination,
  wherein in case that the information in which the searched
job processing device is related to the user is stored in the
memory, the hardware processor displays the searched job
processing device which is related to the user and the user
to whom the searched job processing device is related.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention:

FIG. 4 is a view showing an example of the substitute execution history;

FIG. 5 is a view showing an example of the window for informing a user of the candidates of the transfer destination and the users who requested the transfer of the job in the past;

DETAILED DESCRIPTION OF THE EMBODIMENTS

Hereinafter, one or more embodiments of the present invention will be described with reference to the drawings. However, the scope of the invention is not limited to the disclosed embodiments.

First Embodiment

Figure 1:
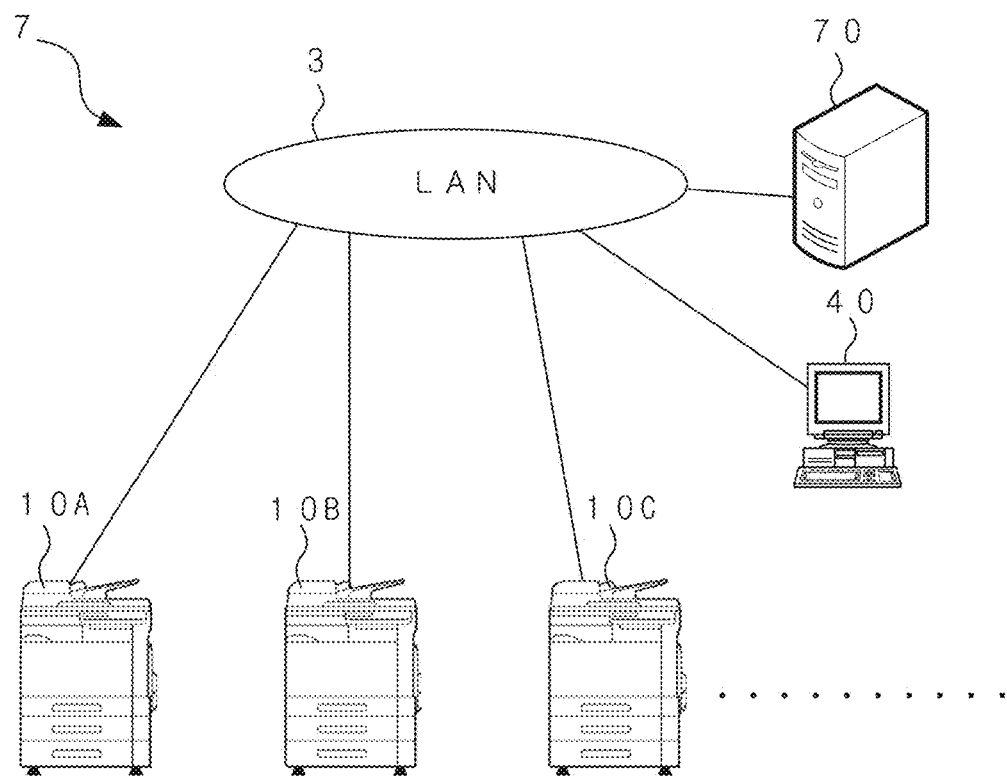
FIG. 1 is a view showing the print system including the server and the image forming apparatus according to the first embodiment.

FIG. 1 shows the print system 7 including the image forming apparatus 10 according to the first embodiment. In the print system 7, a plurality of image forming apparatuses 10 (in this embodiment, the image forming apparatuses are denoted by the reference numerals 10A, 10B and 10C, respectively), the PC terminal 40 and the server 70 are connected via the network, such as LAN (Local Area Network) 3 and the like so as to communicate with each other. According to the necessity, the image forming apparatuses 10A, 10B and 10C are collectively referred to as the image forming apparatus 10, or optional one image forming apparatus is referred to as the image forming apparatus 10.

The PC terminal 40 is a so-called desktop type of PC terminal which comprises a display unit and an operating unit, such as a mouse, a keyboard, a display and the like. The PC terminal 40 can display and edit the document file and the image file, and can transmit the print job for printing the contents of the data file to the image forming apparatus 10. When the print job is transmitted, the PC terminal 40 carries out the setting of the print job by using the printer driver, and transmits the print job having the set contents to the image forming apparatus 10.

The image forming apparatus 10 is a so-called multi function peripheral which executes the jobs, such as a copy job for printing out an image of an original on a recording sheet by optically reading the original, a scan job for storing the image data of the read original as a file and/or for transmitting the image data to an external device, a print job for printing out an image on a recording sheet in accordance with the data received from the external PC terminal 40 or the portable terminal, and the like.

The image forming apparatus 10 has the function as the job processing device. In the first embodiment, the image forming apparatus 10 has the substitute printing function for transferring the print job in which the execution is interrupted due to the occurrence of the trouble and the print job which is held when the trouble is caused, to another image forming apparatus 10 to instruct another image forming apparatus 10 to substitutionally execute the print job, in case that the trouble or the like is caused in the image forming apparatus 10 and the print job cannot be executed.

In the first embodiment, in case that the print job is transferred to another image forming apparatus 10 by the substitute printing function to instruct another image forming apparatus 10 to substitutionally execute the print job, the image forming apparatus 10 relates another image forming apparatus 10 which is the substitute execution destination (transfer destination) to the user who selects the substitute execution destination, and stores the information indicating the relation between another image forming apparatus 10 which is the substitute execution destination and the user who selects the substitute execution destination, in the storing unit.

In case that the print job is transferred by the substitute printing function, the image forming apparatus 10 searches other image forming apparatuses 10 which can become the substitute execution destination of the print job and displays the candidates of the substitute execution destination, which are obtained by the above search, on the operation panel 30 (See FIG. 2) which will be explained below. Then, the image forming apparatus 10 receives the selection of the image forming apparatus 10 which is the substitute execution destination among the candidates from the user, and transfers the print job to the selected image forming apparatus 10 to instruct the selected image forming apparatus 10 to substitutionally execute the print job.

Further, when the candidates of the substitute execution destination are displayed on the operation panel 30, the image forming apparatus 10 checks whether each candidate (image forming apparatus 10) of the substitute execution destination is registered in the situation the candidate is related to the user. In case that the candidate is registered in the situation the candidate is related to the user, the image forming apparatus 10 displays the user which is registered in the storing unit in the situation the candidate is related to the user, in addition to the candidate (image forming apparatus 10). Thereby, even if the user does not grasp the accurate position, the operating method and the like of the device which is the substitute execution destination, it is possible to promptly obtain the print document at the device which is the substitute execution destination by requesting the support to the user who is displayed with the substitute execution destination.

The server 70 has the function as the server for managing the substitute execution of the job. The detail of the server 70 will be explained later in the second embodiment.

Next, the configuration of the image forming apparatus 10 according to the first embodiment will be explained.

Figure 2:
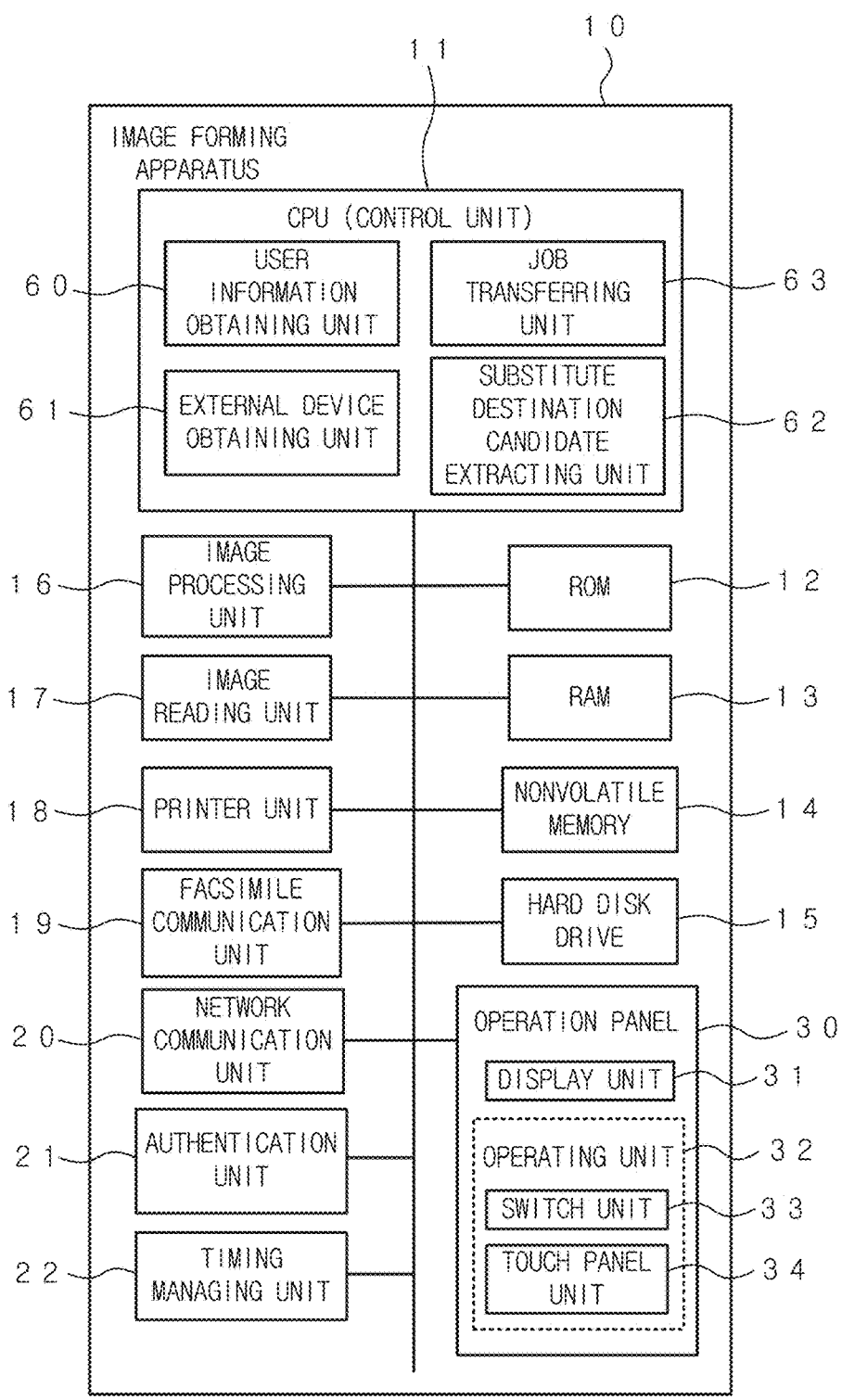
FIG. 2 is a block diagram showing the schematic configuration of the image forming apparatus according to the first embodiment.

FIG. 2 is a block diagram showing the schematic configuration of the image forming apparatus 10 according to the first embodiment. The image forming apparatus 10 comprises a CPU (Central Processing Unit) 11 for entirely controlling the operation of the image processing apparatus 10. The CPU 11 having the microprocessor is connected with a ROM (Read Only Memory) 12, a RAM (Random Access Memory) 13, a nonvolatile memory 14, a hard disk drive 15, an image processing unit 16, an image reading unit 17, a printer unit 18, a facsimile communication unit 19, a network communication unit 20, an authentication unit 21, a timing managing unit 22 and the operation panel 30 via a bus.

By the CPU 11, a middleware, application programs and the like are executed on an OS (Operating System) program as a base. Further, the CPU 11 has the function as the control unit for controlling the display contents to be displayed on the operation panel 30.

In the first embodiment, the CPU 11 has the function as the user information obtaining unit 60, the external device obtaining unit 61, the substitute destination candidate extracting unit 62 and the job transferring unit 63.

Further, the CPU 11 has the function as the job reception unit, the trouble detection unit, the substitute destination search unit, the selection unit, the transfer unit, the user specifying unit, the user information obtaining unit, the administrator information obtaining unit and the face picture obtaining unit.

In the ROM 12, various types of programs are stored. By executing various types of processes by the CPU 11 in accordance with these programs, each function of the image forming apparatus 10 is realized. Further, in the ROM 12, the programs for executing a series of the control for the image forming apparatus 10 by the CPU 11 are stored.

The RAM 13 is used as a work memory for temporarily storing various data when the CPU 11 executes the process in accordance with the programs, an image memory for storing an image data, and the like.

The nonvolatile memory 14 is a memory (flash memory) in which the stored contents are not damaged even if the image forming apparatus 10 is turned off, and is used for storing various types of settings.

The hard disk drive 15 is a large-capacity nonvolatile memory device. In the hard disk drive 15, the OS program, various types of application programs, the print data, the image data, the history relating to the jobs and the like, are stored.

In the first embodiment, the hard disk drive 15 has the function as the storing unit. Specifically, the information in which the image forming apparatus 10 which was the substitute execution destination when the substitute printing function was used, is related to the user who selected the substitute execution destination, is registered and stored in the substitute execution history 64 (See FIG. 4). The substitute execution history 64 will be explained later.

The image processing unit 16 carries out the rasterizing process for converting print data into image data, the compression/decompression process for the image data, and the like in addition to the processings, such as the enlargement/reduction or the rotation of image data.

The image reading unit 17 has the function for obtaining image data by optically reading an image of an original. For example, the image reading unit 17 comprises a light source for irradiating an original with light, a line image sensor for reading the original line by line in the width direction of the original by receiving the reflected light from the original, a moving unit for sequentially moving the reading position line by line in the longitudinal direction of the original, an optical system having lenses, mirrors, and the like for guiding the reflected light from the original to the line image sensor and focusing the reflected light on the line image sensor, a converting unit for converting an analog image signal outputted from the line image sensor into digital image data, and the like.

The printer unit 18 has the function for forming an image on the recording sheet in accordance with the image data. In this embodiment, the printer unit 18 is configured as a so-called laser printer which comprises a conveying device for the recording sheet, a photoconductive drum, a charging device, a laser unit, a developing device, a transfer and separation device, a cleaning device and the fixing device, and which forms an image by the electrophotographic process. Alternatively, an image may be formed by another type of printer.

The facsimile communication unit 19 has the function for transmitting and receiving the image data to/from an external device having the facsimile function via a public line.

The network communication unit 20 has the function for communicating the data with the PC terminal 40, the other image forming apparatuses 10 and another external device via the network, such as the LAN 3.

The authentication unit 21 authenticates a user who uses the image forming apparatus 10. In the first embodiment, the method for checking the entered user ID and the entered password is used as the authentication method. The user authentication method is not limited to this. As the user authentication method, a suitable method, such as the method for specifying the log-in user by obtaining the user information registered in the IC card when the IC card is read by a card reader, the fingerprint authentication, the retina authentication or the like, may be used.

The timing managing unit 22 is a so-called timepiece, and indicates the information of the date and time and the like. In the first embodiment, the CPU 11 obtains the date and time at which the print job is transferred by the substitute printing function, from the information of the date and time indicated by the timing managing unit 22.

The operation panel 30 comprises a display unit 31 and an operating unit 32. The operating unit 32 comprises a switch unit 32, such as a start button and the like, and a touch panel unit 34. The display unit 31 comprises a liquid crystal display (LCD) and the like, and has the function for displaying various types of operation windows, setting windows and the like. In the first embodiment, the CPU 11 controls the display contents to be displayed on the operation panel 30 and the reception of the operation via the operation panel 30.

The touch panel unit 34 is provided on the display unit 31. The touch panel unit 34 detects the coordinate position on which a user presses down the display surface of the display unit 31 by using a touch pen, a user's finger or the like, the flick operation, the drag operation and the like.

Next, the case in which the image forming apparatus 10 transfers the print job to another device to instruct another device to substitutionally execute the print job by the substitute printing function will be explained. For example, in the following situations, the image forming apparatus 10 judges that the substitute printing function is used.

(1) During the execution of the print job, the trouble is caused in the image forming apparatus 10. As a result, the execution of the print job is interrupted.

(2) When the trouble is caused in the image forming apparatus 10, there is a print job held by the image forming apparatus 10.

In case of the above (1), the image forming apparatus 10 transfers the unexecuted process of the interrupted print job to another image forming apparatus 10 as the midway job and instructs another image forming apparatus 10 to substitutionally execute the midway job. Alternatively, the image forming apparatus 10 may transfer the interrupted print job as the unexecuted job, and may instruct another image forming apparatus 10 to execute the printing including the pages which have been printed by the image forming apparatus 10, again. In case of the above (2), the image forming apparatus 10 transfers the held print job to another image forming apparatus 10 to instruct another image forming apparatus 10 to substitutionally execute the print job. When the report indicating the execution of the transferred print job is finished is received from another image forming apparatus 10 which is the substitute execution destination, the transferred print job is deleted from the image forming apparatus 10 which transfers the print job.

In case that a plurality of print jobs to be transferred exist in the image forming apparatus 10, for each print job, another image forming apparatus 10 may be set to the substitute execution destination. Alternatively, one image forming apparatus 10 may be set as the substitute execution destination of all of the print jobs, collectively.

Figure 3:
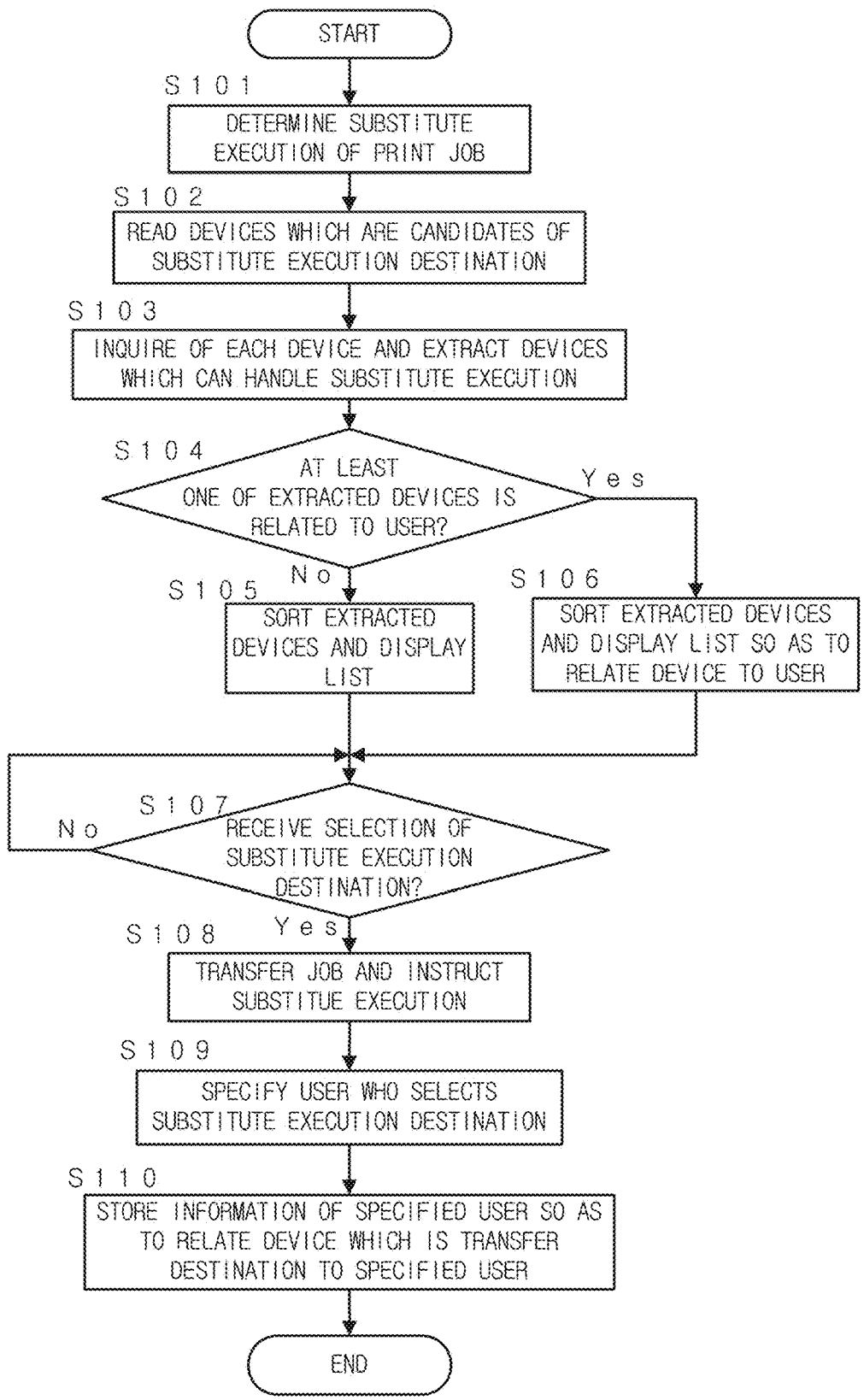
FIG. 3 is a flowchart showing the process which is carried out by the image forming apparatus according to the first embodiment.

Next, the process to be carried out when the image forming apparatus 10 according to the first embodiment instructs another image forming apparatus 10 to substitutionally execute the job, will be explained by referring to FIG. 3. FIG. 3 shows the flowchart of the process in which the image forming apparatus 10 instructs another image forming apparatus 10 to substitutionally execute the job.

Firstly, the image forming apparatus 10 judges that the print job cannot be executed due to the occurrence of the trouble or the like. When the image forming apparatus 10 determines the substitute execution of the print job (Step S101), the information indicating other image forming apparatuses 10 which are the candidates of the substitute execution destination is read from the hard disk drive 15 (Step S102). Then, the image forming apparatus 10 inquires of each image forming apparatus 10 which is the candidate, whether the substitute execution of the print job to be transferred can be handled at the current time. The image forming apparatus 10 extracts other image forming apparatuses 10 which transmit the response indicating that the substitute execution can be handled (Step S103).

Next, the image forming apparatus 10 checks whether each image forming apparatus 10 which is extracted in Step S103 is registered so as to be related to a user in the substitute execution history 64 (See FIG. 4) which will be explained later (Step S104).

In case that none of the extracted image forming apparatuses 10 is registered so as to be related to a user in the substitute execution history 64 (Step S104; No), the extracted image forming apparatuses 10 are sorted and displayed in the list (Step S105). Then, the process proceeds to Step S107.

In case that at least one of the extracted image forming apparatuses 10 is registered so as to be related to a user in the substitute execution history 64 (Step S104; Yes), the extracted image forming apparatuses 10 are sorted so as to prioritize the extracted image forming apparatus 10 which is related to a user, and are displayed in a list. At this time, the extracted image forming apparatus 10 which is registered so as to be related to a user in the substitute execution history 64 is displayed with the user to whom the extracted image forming apparatus 10 is related (Step S106). Then, the process proceeds to Step S107. The method for sorting the extracted image forming apparatuses 10 will be explained later.

Next, the image forming apparatus 10 waits for the selection of the image forming apparatus 10 which is the substitute execution destination of the print job from a user (Step S107: No). When the above selection is received (Step S107: Yes), the image forming apparatus 10 transfers the job to the selected image forming apparatus 10 to instruct the selected image forming apparatus 10 to substitutionally execute the job (Step S108).

Then, the image forming apparatus 10 specifies the user who selects the image forming apparatus 10 as the substitute execution destination (Step S109), and registers the specified user so as to relate the selected image forming apparatus 10 which is the substitute execution destination to the specified user (Step S110). The process is ended.

In the first embodiment, the image forming apparatus 10 specifies the user who is logged in by the user authentication when the image forming apparatus 10 transfers the print job by the substitute printing function, as the user who selects the substitute execution destination.

However, the method for specifying the user who selects the substitute execution destination is not limited to this. For example, in case that because the user logs in the image forming apparatus 10 as the guest user, the user who currently uses the image forming apparatus 10 cannot be specified, the image forming apparatus 10 receives the entry of the user who selects the substitute execution destination after the print job is transferred. Then, the entered user may be specified as the user who selects the substitute execution destination.

FIG. 4 shows an example of the substitute execution history 64 in which the information indicating that the image forming apparatus 10 which was the substitute execution destination is related to the user who selected the substitute destination, is registered. The substitute execution history 64 of FIG. 4 is the history which is stored in the image forming apparatus 10A.

In the substitute execution history 64 of FIG. 4, as the substitute execution destinations which were selected in the past, in addition to the image forming apparatus 10B and the image forming apparatus 10C (in the drawing, the image forming apparatus 10B and the image forming apparatus 10C are referred to as "device B" and "device C, respectively), the devices, such as the device D, the device E, the device F, the device G and the like, are registered. Each device is related to the user who selected the device as the substitute execution destination.

In the first embodiment, the image forming apparatus 10 which was the substitute execution destination is further related to the information indicating the transfer timing and the department of the user in addition to the user who selected the device as the substitute execution destination.

The transfer timing indicates the date and time at which the print job was transferred by the substitute printing function.

The department indicates the name of the department to which the user who selected the substitute execution destination belongs. The department of the user may be previously registered in the image forming apparatus 10. Alternatively, the information indicating the department of the user may be obtained at the timing of the user authentication or the like.

FIG. 5 shows a display example of the window 65 for displaying the candidates of the substitute execution destinations, the user to whom the candidate is related and the other information. The window 65 is displayed on the operation panel 30 of the image forming apparatus 10A, the user's portable terminal which will be explained later, and the like.

In the window 65 of FIG. 5, as the candidates of the substitute execution destination, the image forming apparatus 10B, the image forming apparatus 10C (in the drawing, the image forming apparatus 10B and the image forming apparatus 10C are referred to as "device B" and "device C, respectively) and the device Z are displayed. In case of the image forming apparatuses 10B and 10C, because the users to whom the image forming apparatus 10B and the image forming apparatus 10C are related are registered in the substitute execution history 64, the user, the transfer tinting and the department are displayed together with the device name. On the other hand, in case of the device Z, because the user to whom the device Z is related is not registered in the substitute execution history 64, only the device name is displayed.

In the window 65, the image forming apparatus 10B is displayed so as to be related to the user A and the user C, and the image forming apparatus 10C is displayed so as to be related to the user D. Further, in the window 65. "department X" is displayed as the department of the user A. and "20xx/10/20" is displayed as the date and time at which the user A transfers the print job to the image forming apparatus 10B. In the window 65, it is indicated that the department of the user C is unknown, and "20xx/10/21" is displayed as the date and time at which the user C transfers the print job to the image forming apparatus 10B. In the window 65. "department Z" is displayed as the department of the user D, and "20xx/10/20" is displayed as the date and time at which the user D transfers the print job to the image forming apparatus 10C.

After the user confirms the display contents in the window 65, the user selects the substitute execution destination of the print job. In the window 65, the device which is currently selected as the substitute execution destination is grayed.

For example, in case that the device which is related to the user who is the acquaintance is selected, there is high possibility that the information relating to the above device can be easily obtained. In case that the device which is related to the user who transferred the print job at the newest transfer timing is selected, there is high possibility that the above user recognizes the newest information relating to the selected device. Even if there is no acquaintance among the displayed users, when the device which is related to the user who belongs to the familiar department is selected, there is high possibility that it is possible to easily visit the user who belongs to the familiar department.

After the substitute execution destination of the print job is selected, the user presses down the substitute execution start button 66. When the substitute execution start button 66 is pressed down, the image forming apparatus 10A transfers the print job to the image forming apparatus 10 (in the drawing, the device B) which is selected as the substitute execution destination at this time, and instructs the image forming apparatus 10 to substitutionally execute the print job.

The display unit for displaying the window 65 of FIG. 5, that is, the display unit for displaying the information indicating the candidates of the substitute execution destination, the user to whom each candidate is related, and the like, is not limited to the operation panel 30 of the image forming apparatus 10A. For example, the above information may be displayed on the portable terminal of the user who currently uses the image forming apparatus 10A, such as the log-in user, or the portable terminal of the user who stays near the image forming apparatus 10A by transmitting the window 65 to the above portable terminal.

In case that the window 65 is displayed on another device, such as the above-described portable terminal, another device receives the selection of the substitute execution destination and the image forming apparatus 10A receives the result of the selection. Specifically, when the substitute execution start button 66 is pressed down in the situation in which the substitute execution destination is selected in the window 65 displayed on another device, another device which displays the window 65, informs the image forming apparatus 10A of the selected substitute execution destination. Then, the image forming apparatus 10A which obtains the result of the selection of the substitute execution destination, transfers the print job to the selected substitute execution destination to instruct the selected substitute execution destination to substitutionally execute the print job.

As the method for sorting a plurality of image forming apparatuses 10 as the candidates of the substitute execution destination, firstly, the device which is related to the user is prioritized. Further, a plurality of image forming apparatuses 10 are sorted in accordance with the frequency of the selection of the substitute execution destination for the predetermined time period. For example, the image forming apparatus 10A sorts the candidates of the substitute execution destination according to the frequency of the substitute execution for the predetermined time period (for example, since three days ago), and displays the candidates in the list.

For example, the image forming apparatuses 10 are sorted in the order of descending frequency of the selection of the substitute execution destination. In the window 65 of FIG. 5, firstly, the image forming apparatus 10B and the image forming apparatus 10C which are related to the users respectively, are prioritized to the device Z (in this drawing, the image forming apparatuses 10B and 10C are displayed on the upper side than the device Z.). Further, because the print job is transferred to the image forming apparatus 10B twice but the print job is transferred to the image forming apparatus 10C once, the image forming apparatuses 10B and 10C are sorted so as to prioritize the image forming apparatus 10B to the image forming apparatus 10C (in the drawing, the image forming apparatus 10B is displayed on the upper side than the image forming apparatus 10C.). Then, the candidates of the substitute execution destination are displayed in a list.

The candidates of the substitute execution destination may be sorted according to another standard. For example, the candidates of the substitute execution destination may be sorted according to the device name, the number of the users who select each image forming apparatus as the substitute execution destination, the department, the transfer timing, or the like.

Figure 6:
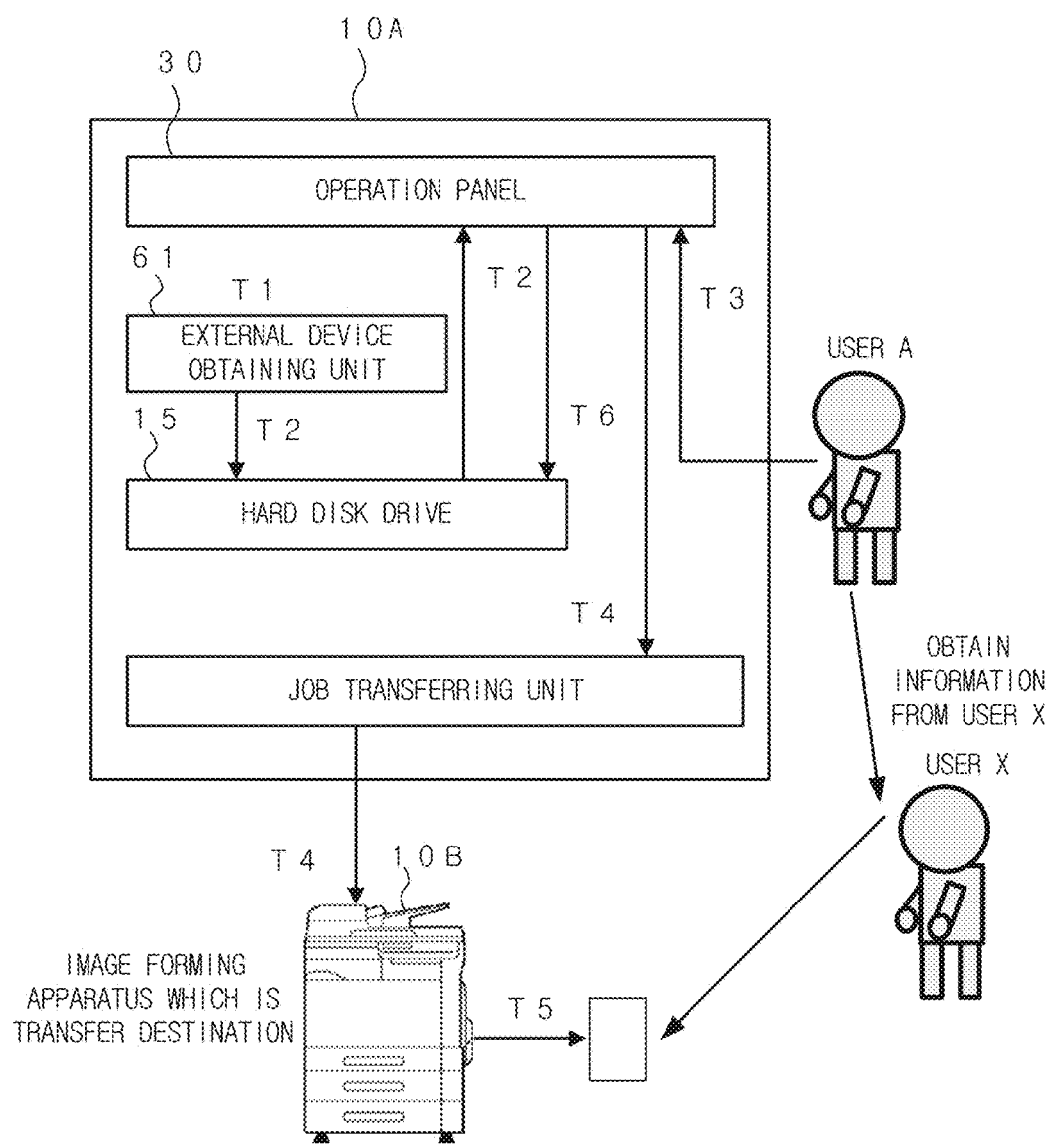
FIG. 6 is a view showing the situation in which the substitute printing is executed.

Next, the specific example of the case in which the substitute printing function is used will be explained. FIG. 6 shows the case in which the image forming apparatus 10A uses the substitute printing function. Further, FIG. 6 shows the process which is carried out by each unit of the image forming apparatus 10A.

Firstly, the image forming apparatus 10A detects the trouble caused therein during the execution of the print job, and judges that the substitute printing function is used. Next, the image forming apparatus 10A checks the candidates of the substitute execution destination. Specifically, the external device obtaining unit 61 inquires of each of the other image forming apparatuses 10 connected via the network, whether the substitute execution of the print job to be transferred can be handled (T).

Then, the image forming apparatus 10A treats other image forming apparatuses 10 which transmit the response indicating that the substitute execution can be handled, as the candidates of the substitute execution destination. Further, the image forming apparatus 10A checks the substitute execution history 64 stored in the hard disk drive 15. In case that the candidate of the substitute execution destination is related to the user, the image forming apparatus 10A displays the above candidate together with the user to whom the above candidate is related, on the operation panel 30 in the list (T2).

A user who views the contents of the displayed list (in FIG. 6, the user A), selects the substitute execution destination and carries out the operation for starting the substitute execution (T3). The image forming apparatus 10A which receives the operation for starting the substitute execution, transfers the print job to be transferred, to the selected substitute execution destination (T4). In FIG. 6, the print job is transferred to the image forming apparatus 10B.

The user A moves to the user who is registered so as to relate the device which is the substitute execution destination (in the drawing, the user X). Then, the user A asks the user X about the accurate position, the operating method and the like of the device which is the substitute execution destination. Further, the user A moves to the device which is the substitute execution destination. The image forming apparatus 10B which is the substitute execution destination, substitutionally executes the transferred print job, and the user A obtains the printed document (T5).

The image forming apparatus 10A specifies the user A who is logged in the image forming apparatus 10A when the print job is transferred, as the user who selects the substitute execution destination. Then, the image forming apparatus 10A registers the image forming apparatus 10B which is the substitute execution destination and the user who selects the substitute execution destination (in the drawing, the user A), in the substitute execution history 64 so as to relate the image forming apparatus 10B to the user A (T6). At the next time, in case that the image forming apparatus 10B becomes the candidate of the substitute execution destination when the image forming apparatus 10A uses the substitute printing function, the image forming apparatus 10B is displayed as the candidate in the list together with the user A to whom the image forming apparatus 10B is related.

Next, two modified examples will be explained.

Modified Example 1: Instead of the Unique Identifier, the Model of the Device is Related to the User In the modified example 1, in case that the print job is substitutionally executed, instead of the unique identifier of the device which is the substitute execution destination, the model of the device which is the substitute execution destination and the user who selects the substitute execution destination are registered so as to relate the model to the user. In case that the candidate of the substitute execution destination is displayed, the user to whom the model of the candidate of the substitute execution destination is related is indicated together with the candidate of the substitute execution destination.

For example, in case that the model of the image forming apparatus 10A is the same as that of the image forming apparatus 10C, the user who selected the image forming apparatus 10A as the substitute execution destination in the past is indicated so as to relate the image forming apparatus 10C when the image forming apparatus 10C becomes the candidate of the substitute execution destination.

Among the image forming apparatuses having the same model, the operating method of one image forming apparatus is generally common with that of another image forming apparatus. When the user who selects the substitute execution destination asks the user indicated together with the device which is the substitute execution destination, there is high possibility that the operating method of the device which is the substitute execution destination can be understood.

Modified Example 2: An Administrator for the Substitute Execution Destination and the Face Picture of the User to Whom the Substitute Execution Destination is Related are Also Shown In the modified example 2, in case that the candidate of the substitute execution destination and the user to whom the candidate is related, are displayed, the administrator for the device which is the candidate and the picture of the user are also displayed.

The information of the administrator for the device which is the candidate of the substitute execution destination may be previously stored in the hard disk drive 15 and be displayed by reading the information of the administrator from the hard disk drive 15. Alternatively, the information of the administrator may be obtained and displayed when the candidate of the substitute execution destination and the user to whom the candidate is related are displayed.

For example, even in case that the device which is the substitute execution destination is a device provided outside the company and the user to whom the above substitute execution destination is related is a stranger, it is possible to ask the administrator for the substitute execution destination about the operating method and the accurate position of the device.

The face picture of the use to whom the candidate of the substitute execution destination is related may be previously stored in the hard disk drive 15 and be displayed by reading the picture from the hard disk drive 15. Alternatively, the face picture may be obtained and displayed when the candidate of the substitute execution destination and the user to whom the candidate is related are displayed. For example, the face picture obtained by using the camera unit is stored. Alternatively, the face picture is obtained from an external device, such as a server or the like. The method for obtaining the face picture is not limited to this. A suitable method can be adopted.

For example, even in case that the user who selects the substitute execution destination is not acquainted with the user to whom the device which is the substitute execution destination is related, because the face picture of the user to whom the device is related is displayed, the user to whom the device is related can be easily found.

In the modified example 2 of the first embodiment, both of the administrator for the candidate of the substitute execution destination and the face picture of the user to whom the candidate is related are displayed together with the candidate and the user to whom the candidate is related. However, any one of the administrator and the face picture may be displayed together with the candidate and the user to whom the candidate is related.

Second Embodiment

In the first embodiment, in case that the image forming apparatus 10 uses the substitute printing function, the user who selected the device as the substitute execution destination at the above image forming apparatus 10 in the past is displayed. However, in the second embodiment, the user who selected the substitute execution destination when the substitute printing function was used in the past at the device except the device which transferred the print job, is also displayed.

Specifically, when one of a plurality of image forming apparatuses 10 connected via the network cannot execute the print job due to the occurrence of the trouble, the print job is transferred to another image forming apparatus 10 to instruct another image forming apparatus 10 to substitutionally execute the print job. In this case, the server 70 obtains the information of the instructed image forming apparatus 10 which is the substitute execution destination and the information of the user who requests the substitute execution, and stores the obtained information so as to relate the instructed image forming apparatus 10 to the user.

When the notification indicating that the print job will be substitutionally executed by transferring the print job is received from one of a plurality of image forming apparatuses 10, another image forming apparatus 10 which can become the substitute execution destination of the print job, is specified. In case that the specified image forming apparatus 10 is related to the user, the information indicating the specified image forming apparatus 10 and the user to whom the specified image forming apparatus is related is transmitted to the image forming apparatus 10 which transmits the above notification, and the transmitted information is displayed in the image forming apparatus 10 transmitting the above notification.

In the second embodiment, in case that the image forming apparatus 10 instructs another image forming apparatus 10 to substitutionally execute the print job, the notification indicating that the print job will be substitutionally executed by transferring the print job is transmitted to the server 70. The server 70 which receives the above notification, obtains the print condition of the print job from the image forming apparatus 10 which transmits the above notification. Further, the server 70 searches and specifies the device which can become the substitute execution destination of the print job from the devices connected via the network. However, the device which transmits the above notification may search the device which can become the substitute execution destination of the print job and may transmit the result of the above search to the server 70. The other features of the second embodiment are substantially the same as the contents disclosed in the first embodiment.

Next, the configuration of the sever 70 according to the second embodiment will be explained.

Figure 7:
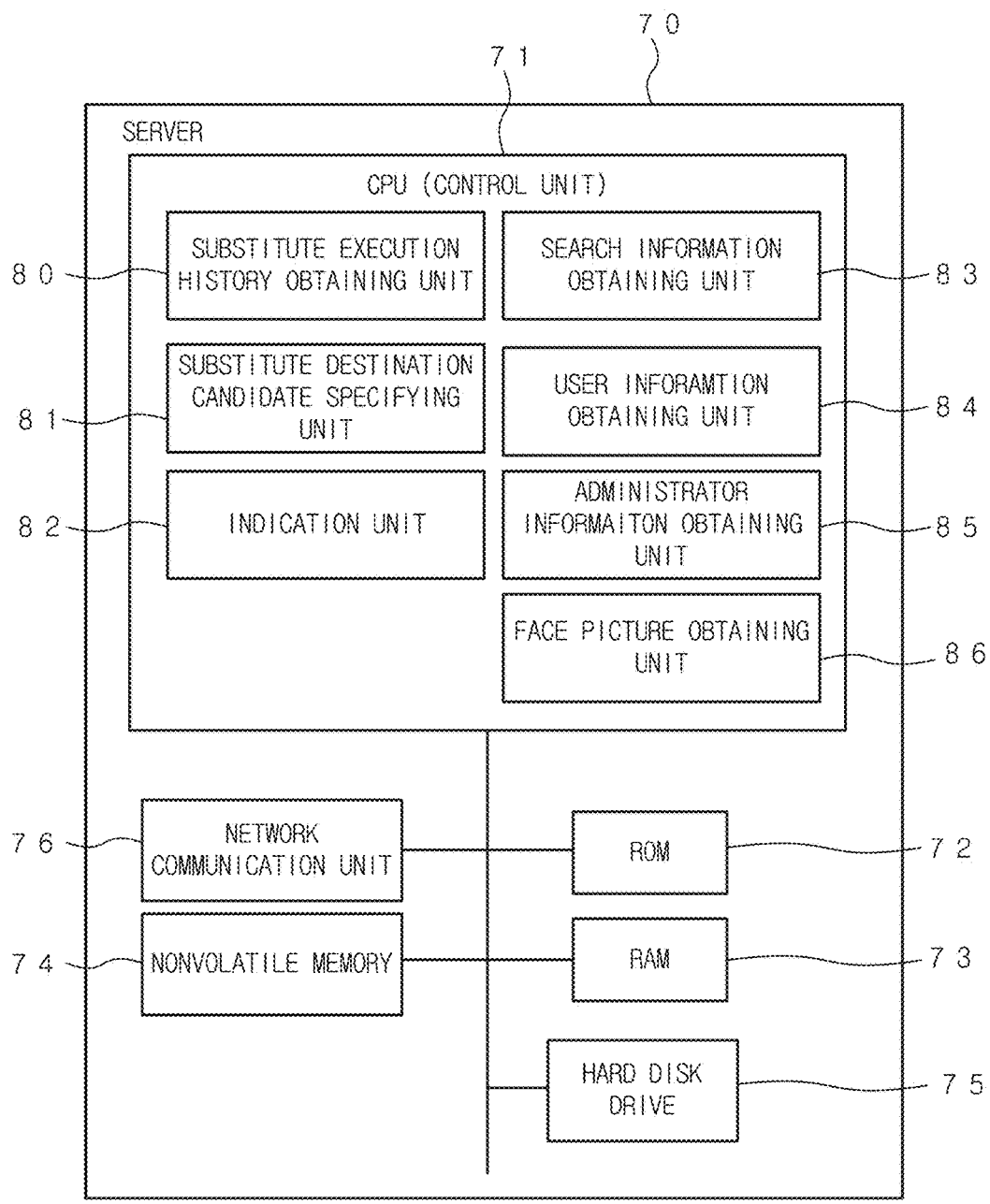
FIG. 7 is a block diagram showing the schematic configuration of the server according to the second embodiment.

FIG. 7 is a block diagram showing the schematic configuration of the server 70 according to the second embodiment. The server 70 comprises a CPU 71 for entirely controlling the operation of the server 70. The CPU 71 is connected with a ROM 72, a RAM 73, a nonvolatile memory 74, a hard disk drive 75 and a network communication unit 76.

The CPU 71 has the function as the control unit for controlling the operation of the server 70. In the second embodiment, the CPU 71 has the function as the substitute execution history obtaining unit 80, the substitute destination candidate specifying unit 81, the indication unit 82, the search information obtaining unit 83, the user information obtaining unit 84, the administrator information obtaining unit 85 and the face picture obtaining unit 86.

In the ROM 72, various types of programs are stored. By executing various types of processes by the CPU 71 in accordance with these programs, each function of the server 70 is realized. Further, in the ROM 72, the programs for executing a series of the control for the server 70 by the CPU 71 are stored.

The RAM 73 is used as a work memory for temporarily storing various data when the CPU 71 executes the process in accordance with the programs, and the like.

The nonvolatile memory 74 is a memory (flash memory) in which the stored contents are not damaged even if the server 70 is turned off, and is used for storing various types of fixed data and settings.

The hard disk drive 75 is a large-capacity nonvolatile memory device. In the hard disk drive 75, various types of application programs, the information relating to each image forming apparatus 10, the information of each user and the like, are stored.

In the second embodiment, the hard disk drive 75 has the function as the storing unit. Further, in the second embodiment, the server programs which are used in order for the CPU 71 to function as the substitute execution history obtaining unit 80, the substitute destination candidate specifying unit 81, the indication unit 82, the search information obtaining unit 83, the user information obtaining unit 84, the administrator information obtaining unit 85 and the face picture obtaining unit 86, and the substitute execution history 64 are stored in the hard disk drive 75.

The substitute execution history 64 is the same as the substitute execution history 64 stored in the hard disk drive 15 of the image forming apparatus 10 according to the first embodiment. The substitute execution history 64 is the history of the substitute execution registered so as to relate the substitute execution destination to the user who selected the substitute execution destination (or the user who requested the substitute execution) when the substitute printing function was used.

In the second embodiment, like the first embodiment, the server 70 obtains the information indicating the transfer timing and the department of the user, and registers the transfer timing and the department in the substitute execution history 64 so as to relate the substitute execution destination and the user who selected the substitute execution destination. In case that the server 70 transmits the information indicating the candidate of the substitute execution destination and the user to whom the candidate is related, to the image forming apparatus 10 to instruct the image forming apparatus 10 to indicate the candidates and the users, the server 70 also transmits the information indicating the transfer timing and the department to which the substitute execution destination and the user are related, to instruct the image forming apparatus 10 to indicate the transfer timing and the department together with the substitute execution destination and the user.

It is not necessary to previously register the department of the user. When the information indicating the candidate of the substitute execution destination and the user to whom the candidate is related is transmitted to the image forming apparatus 10 to instruct the image forming apparatus 10 to indicate the candidates and the users, the information indicating the department of the user may be obtained. Then, the server 70 may transmit the obtained information to the image forming apparatus 10 to instruct the image forming apparatus 10 to indicate the department of the user together with the candidates and the users.

In the second embodiment, the device which transfers the print job may be related to the substitute execution destination and the user who selects the substitute execution destination to store the information indicating the device which transfers the print job. In this case, the server 70 transmits the information indicating the device which transferred the print job which was substitutionally executed by the substitute execution destination together with the information indicating the candidate of the substitute execution destination and the user to whom the candidate is related, to the image forming apparatus 10 using the substitute printing function, to instruct the image forming apparatus 10 using the substitute printing function to indicate the device which transferred the print job and the like.

The network communication unit 76 has the function for communicating the data with each image forming apparatus 10, the PC terminal 40 and another external device via the network, such as the LAN 3.

Figure 8:
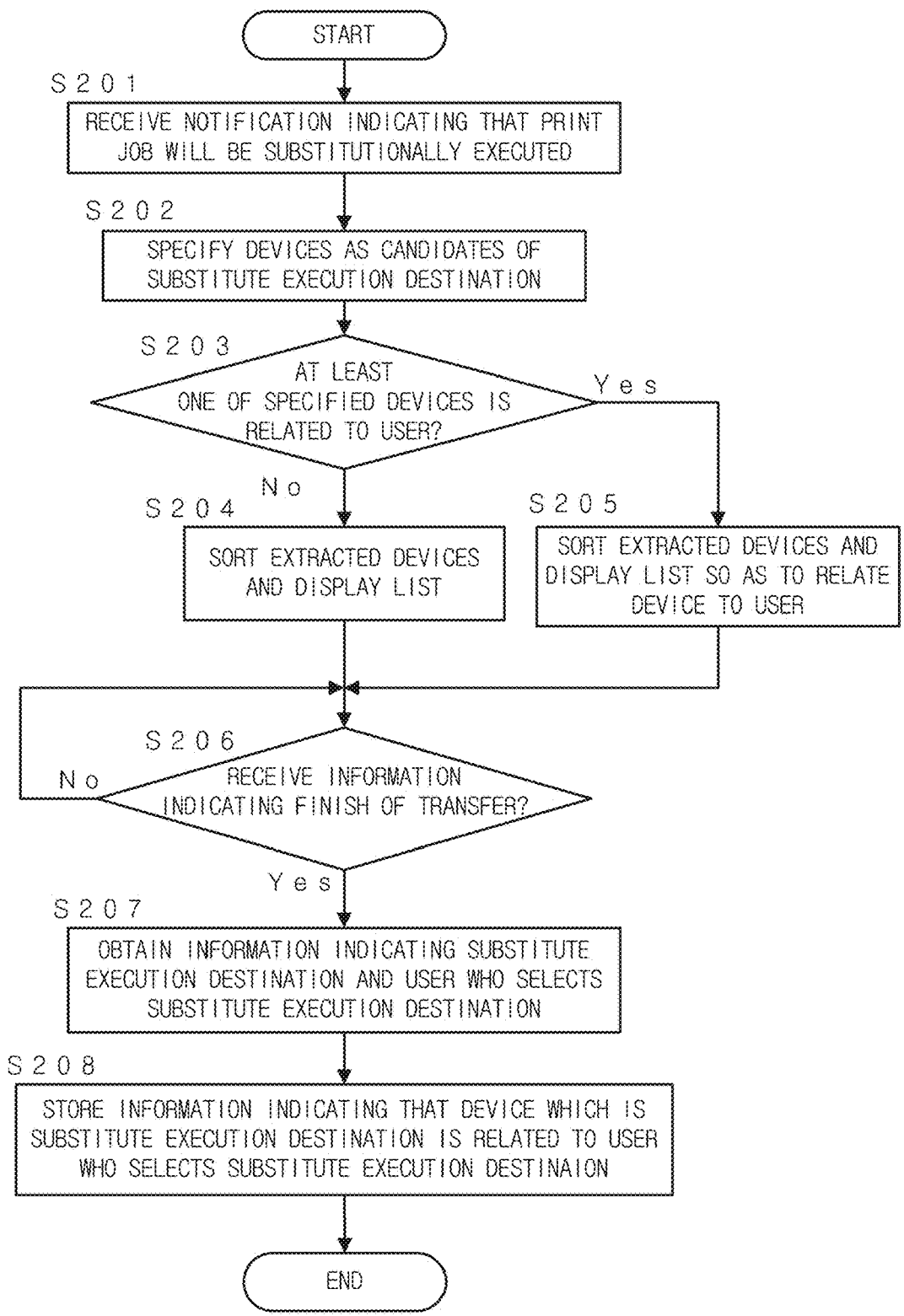
FIG. 8 is a flowchart showing the process which is carried out by the server according to the second embodiment.

Next, the process to be carried out by the server 70 in the second embodiment will be explained by referring to FIG. 8. FIG. 8 shows the flowchart of the process which is carried out by the server 70. Firstly, in case that one image forming apparatus 10 instructs another image forming apparatus 10 to substitutionally execute the print job, the above one image forming apparatus 10 transmits the notification indicating that the print job will be substitutionally executed to the server 70. When the server 70 receives the above notification (Step S201), the server 70 obtains the print condition of the print job from the image forming apparatus 10 which transmits the above notification. Further, the server 70 inquires of each of the other image forming apparatuses 10 connected via the network, whether the substitute execution of the print job can be handled, and specifies the devices which can become the substitute execution destination of the print job (Step S202).

Next, the server 70 searches the candidates of the substitute execution destination specified in Step S202, from the substitute execution history 64 stored in the hard disk drive 75 (Step S203).

In case that none of the specified image forming apparatuses 10 is registered so as to be related to the user in the substitute execution history 64 (Step S203; No), the server 70 sorts the specified image forming apparatuses 10, and transmits the information indicating the specified image forming apparatuses 10 to the image forming apparatus 10 which transmits the above notification in Step S201 to instruct the image forming apparatus 10 which transmits the above notification to indicate the list of the candidates (Step S204). Then, the process proceeds to Step S206.

In case that at least one of the specified image forming apparatuses 10 is registered so as to be related to the user in the substitute execution history 64 (Step S203; Yes), the server 70 sorts the specified image forming apparatuses 10 so as to prioritize the specified image forming apparatus 10 which is related to the user, and transmits the information indicating the specified image forming apparatuses 10 to the image forming apparatus 10 which transmits the above notification in Step S201 to instruct the image forming apparatus 10 which transmits the above notification to indicate the list of the candidates. At this time, in case of the specified image forming apparatus 10 which is related to the user in the substitute execution history 64, the server 70 transmits the information indicating the specified image forming apparatus 10 and the user to whom the specified image forming apparatus 10 is related, to instruct the image forming apparatus 10 which transmits the above notification to indicate the list of the candidate together with the user (Step S205). Then, the process proceeds to Step S206.

In the second embodiment, the method for sorting the image forming apparatuses is the same as that of the first embodiment. However, in the second embodiment, instead of the above-described method, the image forming apparatuses 10 may be sorted according to the device which transferred the print job to be substitutionally executed.

In the device which transmits the above notification in Step S201, the user who confirms the contents indicated in Step S204 or Step S205, selects the substitute execution destination of the print job and carries out the operation for starting the substitute execution. The device which receives the operation for starting the substitute execution, transfers the print job to the selected substitute execution destination to instruct the selected substitute execution destination to substitutionally execute the print job. At this time, the device which receives the operation for starting the substitute execution, specifies the user who selects the substitute execution destination. Then, the device which receives the operation for starting the substitute execution, informs the server 70 of the finish of the transfer of the print job.

The server 70 waits for the reception of the information indicating the finish of the transfer of the print job (Step S206; No). When the server 70 receives the above information (Step S206; Yes), the server 70 obtains the information indicating the substitute execution destination and the user who selects the substitute execution destination (who instructs the substitute execution), from the image forming apparatus 10 which receives the operation for starting the substitute execution (Step S207).

The server 70 registers the device which is the substitute execution destination and the user who selects the substitute execution destination indicated in the information obtained in Step S207 in the substitute execution history 64 so as to relate them (Step S208). Then, the process is ended.

As described in the modified example 1, the information in which the model of the substitute execution destination is related to the user may be stored. Then, in addition to the candidates of the substitute execution destination, the information indicating the user to whom the model of the candidate of the substitute execution destination is related may be transmitted to the device which transmits the notification in Step S201, to instruct the device which transmits the above notification to indicate the list of the candidates.

As described in the modified example 2, the information indicating the administrator for the device which is the candidate of the substitute execution destination and the face picture of the user to whom the candidate is related, may be obtained. Then, in addition to the candidate of the substitute execution destination and the user to whom the candidate is related, the information indicating the administrator and the face picture of the user may be transmitted to the device which transmits the above notification in Step S201 to indicate the list of the candidates.

As described above, the embodiments are explained by using the drawings. However, in the present invention, the concrete configuration is not limited to the above embodiments. In the present invention, various modifications of the above embodiments or the addition of various functions or the like to the embodiments can be carried out without departing from the gist of the invention.

In the first and the second embodiments, the number of the image forming apparatuses 10 is three. However, the number of the image forming apparatuses 10 may be four or more. The job processing device according to each embodiment is not limited to the image forming apparatus 10. The job processing device may be another device, such as a facsimile device or the like.

In the first and the second embodiments, the number of the PC terminal 40 is one. However, the number of the PC terminals 40 may be two or more. Further, the terminal for transmitting the print job to the image forming apparatus 10 is not limited to the PC terminal 40, and may be a portable terminal, a tablet or the like.

In the second embodiment, the server 70 is an independent device. However, the function of the server 70 may be integrated into one image forming apparatus 10.

In at least one of the embodiments, even if the user who selects the substitute execution destination of the job does not grasp the accurate position and the operating method of the device which is the substitute execution destination, because the user who selected the device as the substitute execution destination in the past among the candidates is displayed in addition to the candidates of the substitute execution destination when the substitute execution destination is selected, it is possible to promptly obtain the print document at the device which is the substitute execution destination by requesting the support to the user who is displayed with the device selected as the substitute execution destination.

In at least one of the embodiments, for example, the entry of the information for specifying the user who selects the substitute execution destination is received at the timing of the selection of the substitute execution destination of the job, the timing of the finish of the transfer of the job, or the like. Even if the user who currently operates the job processing device cannot be specified, for example, even if the user logs in the job processing device as the guest user, it is possible to specify the user who selects the substitute execution device.

In at least one of the embodiments, when the substitute execution device of the job is selected, the user who logs in the job processing device by the user authentication is specified as the user who selects the substitute execution destination of the job.

In at least one of the embodiments, the information indicating the department of the user may be previously stored. Alternatively, when the candidate of the substitute execution destination and the user to whom the candidate is related are displayed, the information indicating the department of the user may be obtained and displayed with the candidate and the user. Even if the user who is displayed with the candidate of the substitute execution destination is a stranger to the user who selects the substitute execution destination, because the department of the user who is displayed with the candidate is also displayed, it is possible to easily seek the displayed user.

In at least one of the embodiments, the administrator information of the job processing device may be previously stored. Alternatively, when the candidate of the substitute execution destination and the user to whom the candidate is related are displayed, the information indicating the administrator for the job processing device which is the candidate of the substitute execution destination may be obtained. Then, the administrator may be displayed with the candidate and the user. For example, even in case that the device which is the substitute execution destination is provided outside the company and the user who is displayed with the substitute execution destination is a stranger to the user who selects the substitute execution destination, it is possible to ask the administrator for the substitute execution destination about the accurate position and the operating method of the device.

In at least one of the embodiments, the job processing device instructs the external device to display the selection window for receiving the selection of the substitute execution destination and receives the result of the selection via the selection window from the external device. For example, in case that the job processing device instructs the portable terminal to display the selection window, the user can select the substitute execution destination while the user moves to the device to be selected as the substitute execution destination.

In at least one of the embodiments, the face picture of the user may be previously stored. Alternatively, when the candidate of the substitute execution destination and the user to whom the candidate is related are displayed, the face picture of the user may be obtained and be displayed together with the candidate and the user. Even in case that the user who selects the substitute execution destination is not acquainted with the user who is displayed with the candidate of the substitute execution destination, the user to whom the candidate is related can be easily found by confirming the face picture of the user.

In at least one of the embodiments, the information in which the substitute execution destination which is one of a plurality of job processing devices connected via the network and which substitutionally executed the job in the past is related to the user who requested the above substitute execution destination to substitutionally executed the job, is stored. Then, the information indicating the candidate of the substitute execution destination and the user to whom the candidate is related is transmitted to the job processing device which will instruct the substitute execution destination to substitutionally execute the job, to instruct the job processing device to indicate the candidate and the user.

In order for the job processing device which will instruct another job processing device to substitutionally execute the job to obtain the information indicating the candidates of the substitute execution destination, the job processing device may inquire of each of the other job processing devices whether the substitute execution of the job can be handled, and the obtained information may be transmitted to the server. Alternatively, the server may obtain the information indicating the candidates of the substitute execution destination by searching the job processing device which can be the substitute execution destination of the job.

In at least one of the embodiments, the server obtains the execution condition of the job and searches the job processing device which can be the substitute execution destination of the job.

According to the job processing device, the server and the non-transitory recording medium storing a computer readable program, it is possible to provide the information which is useful for suitably arriving at and operating the device which is the transfer destination, in case that a job is transferred to another device to instruct another device to substitutionally execute the job due to the occurrence of the trouble.

Although embodiments of the present invention have been described and illustrated in detail, the disclosed embodiments are made for purpose of illustration and example only and not limitation. The scope of the present invention should be interpreted by terms of the appended claims.

What is claimed is:
1. A job processing device, comprising:
a job receiver that receives an entry of a job;
a hardware processor that:
executes the job received by the job receiver,
detects a trouble caused in the job processing device;
searches one or more other job processing devices which can be a substitute execution destination of the job in case that the trouble is detected,
retrieves substitute execution history job processing devices related to a user;
displays the searched job processing devices and the substitute execution history job processing devices related to the user as candidates of the substitute execution destination of the job on a display, and receives a selection of the displayed job processing device as the substitute execution destination of the job among the candidates from the user, transfers the job to the selected job processing device which is the substitute execution destination, and specifies the user who selects the substitute execution destination; and a memory that stores information in which the selected job processing device which becomes a transfer destination of the job is related to the specified user who selects one of the searched job processing devices as the transfer destination, wherein in case that the information in which the searched job processing device is related to the user is stored in the memory, the hardware processor displays the searched job processing device which is related to the user and the user to whom the searched job processing device is related.

2. The job processing device of claim 1, wherein the hardware processor receives information for specifying the user who selects the substitute execution destination.

3. The job processing device of claim 1, further comprising an authenticator that carries out a user authentication for the user who uses the job processing device, wherein the hardware processor specifies the user who is currently logged in the job processing device by the user authentication, as the user who selects the substitute execution destination.

4. The job processing device of claim 1, wherein the hardware processor obtains information indicating a department to which the user belongs, and the hardware processor displays the user to whom the searched job processing device is related, and the department to which the user belongs together with the searched job processing device which is related to the user.

5. The job processing device of claim 1, wherein the hardware processor obtains administrator information of the searched job processing device, and the hardware processor displays the administrator information of the searched job processing device together with the searched job processing device.

6. The job processing device of claim 1, wherein the hardware processor instructs an external device to display a selection window for receiving the selection of the displayed job processing device, and receives a result of the selection from the external device.

7. The job processing device of claim 1, wherein the hardware processor obtains a face picture of the user, and the hardware processor displays the user to whom the searched job processing device is related, and the face picture of the user together with the searched job processing device which is related to the user.

8. A server, comprising:
a memory; and
a hardware processor that:
obtains information indicating a first job processing device which is a substitute execution destination and a user who requests a substitute execution in which a second job processing device transfers a job to the first job processing device to instruct the first job processing device to substitutionally execute the job in case that the second job processing device cannot execute the job due to a trouble caused in the second job processing device, the first job processing device and the second job processing device being included in a plurality of job processing devices connected with the server via a network, stores the obtained information indicating the first job processing device and the user in the memory so as to relate the first job processing device to the user as a substitute execution history, and specifies one or more job processing devices which are connected with the server and can be the substitute execution destination when the server receives a notification indicating that the job will be transferred to instruct the substitute execution from the second job processing device, wherein in case that information in which the specified job processing device is related to the user is stored in the memory, the hardware processor transmits the information indicating the specified job processing device and previously used job processing devices from the substitute execution history which are related to the user and the user to whom the specified job processing device is related, to the second job processing device which transmits the notification to instruct the second job processing device to indicate the specified job processing device and the user so as to be related to each other.

9. The server of claim 8, wherein the hardware processor obtains an execution condition of the job indicated in the notification, and the hardware processor searches one or more job processing devices which are connected with the server and can be the substitute execution destination of the job indicated in the notification, in accordance with the obtained execution condition.

10. The server of claim 8, wherein the hardware processor obtains information indicating a department to which the user belongs, and the hardware processor transmits information indicating the user to whom the specified job processing device is related and the department to which the user belongs together with the specified job processing device which is related to the user, to the second job processing device which transmits the notification to instruct the second job processing device to indicate the department together with the specified job processing device and the user.

11. The server of claim 8, wherein the hardware processor obtains administrator information of the specified job processing device, and the hardware processor transmits the administrator information of the specified job processing device together with information indicating the specified job processing device, to the second job processing device which transmits the notification to instruct the second job processing device to indicate the administrator information together with the specified job processing device.

12. The server of claim 8, wherein the hardware processor obtains a face picture of the user, and the hardware processor transmits the face picture of the user to whom the specified job processing device is related together with the information indicating the specified job processing device which is related to the user and the user to whom the specified job processing device is related, to the second job processing device which transmits the notification to instruct the second job processing device to indicate the face picture together with the specified job processing device and the user.

13. A non-transitory recording medium storing a computer readable program which is executed by a server which is connected with a plurality of job processing devices via a network, wherein the program causes the server to:

obtain information indicating a first job processing device which is a substitute execution destination and a user who requests a substitute execution in which a second job processing device transfers a job to the first job processing device to instruct the first job processing device to substitutionally execute the job in case that the second job processing device cannot execute the job due to a trouble caused in the second job processing device, the first job processing device and the second job processing device being included in the plurality of job processing devices connected with the server via the network, store the obtained information indicating the first job processing device and the user so as to relate the first job processing device to the user as a substitute execution history, and specify one or more job processing devices which are connected with the server and can be the substitute execution destination when the server receives a notification indicating that the job will be transferred to instruct the substitute execution from the second job processing device, wherein in case that information in which the specified job processing device is related to the user is stored, the server transmits the information indicating the specified job processing device and previously used job processing devices from the substitute execution history which are related to the user and the user to whom the specified job processing device is related, to the second job processing device which transmits the notification to instruct the second job processing device to indicate the specified job processing device and the user so as to be related to each other.

14. The non-transitory recording medium of claim 13, wherein the server obtains an execution condition of the job indicated in the notification, and the server searches one or more job processing devices which are connected with the server and can be the substitute execution destination of the job indicated in the notification, in accordance with the obtained execution condition.

15. The non-transitory recording medium of claim 13, wherein the server obtains information indicating a department to which the user belongs, and the server transmits information indicating the user to whom the specified job processing device is related and the department to which the user belongs together with the specified job processing device which is related to the user, to the second job processing device which transmits the notification to instruct the second job processing device to indicate the department together with the specified job processing device and the user.

16. The non-transitory recording medium of claim 13, wherein the server obtains administrator information of the specified job processing device, and the server transmits the administrator information of the specified job processing device together with information indicating the specified job processing device, to the second job processing device which transmits the notification to instruct the second job processing device to indicate the administrator information together with the specified job processing device.

17. The non-transitory recording medium of claim 13, wherein the server obtains a face picture of the user, and the server transmits the face picture of the user to whom the specified job processing device is related together with the information indicating the specified job processing device which is related to the user and the user to whom the specified job processing device is related, to the second job processing device which transmits the notification to instruct the second job processing device to indicate the face picture together with the specified job processing device and the user.

* * * * *